March 12, 1940.  M. J. McANENY, JR  2,192,979
HOSE CLAMP
Filed Sept. 8, 1937
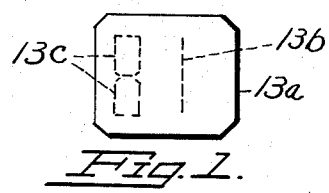
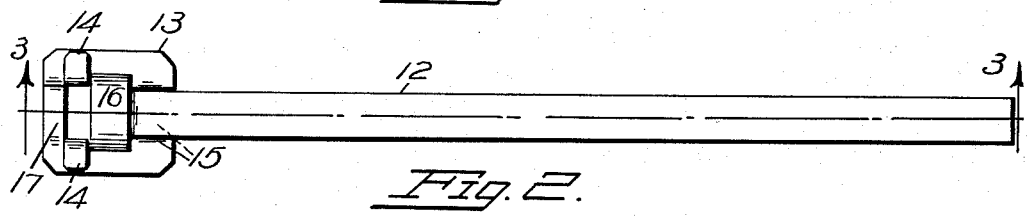
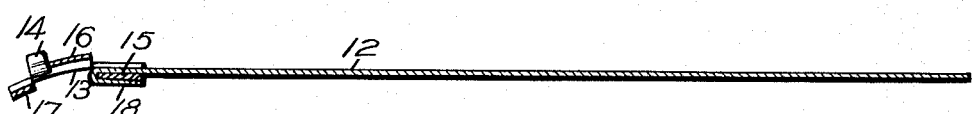
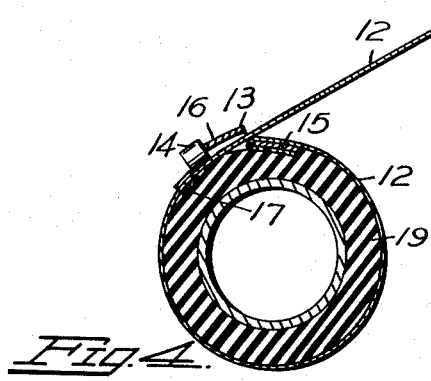
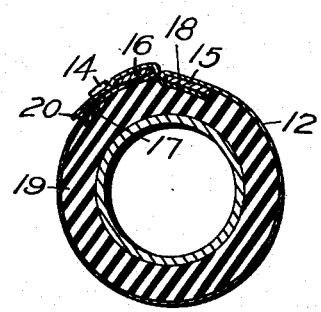
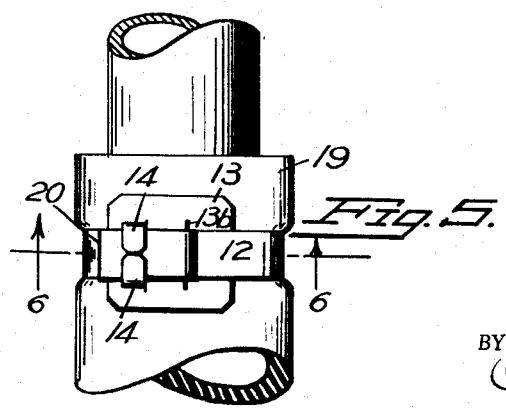
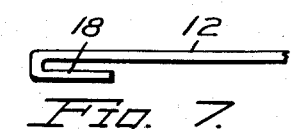
INVENTOR.
M. J. McAneny, Jr.
BY
ATTORNEY.

Patented Mar. 12, 1940

2,192,979

UNITED STATES PATENT OFFICE 2,192,979

HOSE CLAMP

Michael J. McAneny, Jr., Denver, Colo.

Application September 8, 1937, Serial No. 162,917

8 Claims. (Cl. 24—23)

This invention relates to improvements in hose clamps.

It is an object of the invention to provide a hose clamp that can be securely and quickly drawn around a hose in a novel manner.

Another object is to provide a hose clamp that embodies maximum strength with small manufacturing cost.

A further object is to provide a clamp of this character that can be securely locked in its operative position after it is drawn around a hose.

A still further object is to provide a hose clamp that normally is flat prior to its application to a hose.

Still another object is to provide a hose clamp that can be applied effectively to any one of numerous sizes of hose.

Other objects and advantages reside in details that will be fully disclosed in the following description and in the drawing wherein like parts have been similarly designated and in which;

Figure 1 is a plan view of a blank piece of metal from which the head of the improved hose clamp is to be fabricated;

Figure 2 is a plan view of a hose clamp that embodies a preferred form of this invention;

Figure 3 is a longitudinal section along line 3—3 of Figure 2;

Figure 4 is a cross sectional view illustrating the improved clamp in a stage of being applied to a hose;

Figure 5 is an elevation of a hose clamp that embodies this invention, after being applied to a hose;

Figure 6 is a cross section on line 6—6 of Figure 5; and

Figure 7 is a fragmentary detail drawn to a larger scale.

As is well known to those skilled in the art, the union of a flexible hose to a pipe, metal nipple, or the like requires a dependable clamp. This is particularly important where the hose is intended to carry high pressure fluid.

In the drawing reference character 12 denotes a flexible clamp band, preferably made of metal such as stainless steel although other metals having the properties of flexibility combined with tensile strength, can successfully be used. A relatively more rigid head is shown at 13, the metallic blank for which is shown at 13a (Fig. 1). The head can preferably be made by a stamping process by which a slot is cut at 13b and locking tongues or projections 14 are cut out as at 13c after which the tongues or projections 14 are bent upwardly and outwardly in a continuing or in a subsequent operation to the position shown in Figure 2. During fabrication of the head, the metal between the slot 13b and the right end of the head is depressed in a band-fitting groove as at 15 while metal between the slot and the locking tongues or projections 14 is raised in an arch to bridge the band as at 16 and abuts against the tongues 14 as shown in Figs. 2 and 3. The metal between the tongues and the left end of the head is likewise depressed in a band-fitting groove as at 17, in alinement with the first mentioned depressed groove.

The left end of the band is bent back upon itself as at 18, to engage the part 15 of the head and to thus be connected therewith in a secure operative union. The assembly as shown in Figure 2 represents the complete band which may be made up as illustrated at a factory, or the two component elements i. e. the band and the head, can be assembled on the job just prior to use.

A preferred arrangement is to furnish the material of which the band is made, in bulk rolls so that a user may cut off the correct length of band to suit the diameter of the hose to be clamped. The band-end may be bent back to form a hooked end by bending it over as shown in enlarged detail in Figure 7. The special tool disclosed in my co-pending application of September 8, 1937, Serial No. 162,916 is well adapted for effecting this operation.

The bent-back end 18 of the band merely requires to be hooked over the part 15 of the head to effect the assembly. While this is a preferred arrangement for uniting the head and the band, it will be understood that any convenient means can be employed such as riveting, welding or the like.

In use, the improved band is wrapped around a hose 19 and the free end of the band is brought around and passed over the depressed part 17 of the head, then between the locking tongues, next under the raised arch or bridge 16 and out through the slot 13b as shown in Figure 4.

Next the free end of the band is drawn tight to securely draw the clamp around the hose, preferably by means of a special tool that is the subject of my co-pending application Serial No. 162,916 of September 8, 1937. When my special tool is used, the arch or bridge 16 of the head serves as an abutment for the tool during tightening and is effectively reinforced against deformation by the tongues 14 during and after this operation.

After the band is tightened around the hose, the outer end is bent back to the left, over the bridge 16 and between the tongues or projections 14. The surplus band may then be cut off as at 20, leaving a locking end which is bent closely back down on to the band and locked in place by bending the tongues 14 thereover as shown in Figures 5 and 6.

While the preferred arrangement is as above described, it will be apparent that the head and the band might be formed integral. During the process of stamping the head, it can be bent arcuate as shown, it being flexible enough to be forced into further conformity with the hose as it is applied thereto. When the heads and the bands are made as separate elements, one type and size of head may be used with different lengths of bands according to the size of the hose that is to be clamped. Furthermore, in the case of a factory prefabricated band, each band is applicable to a plurality of hose sizes, because surplus length can be cut off to leave the correct locking end.

When the clamp is in place, the slot 13b is substantially closed by the portions of the band passing therethrough, so that the material of the hose can not be forced out through it. The locked band is smooth and compact and free from hazardous projections. Due to the fact that the band is securely hooked over the part 15 of the head and also that it passes over the depressed part 17 of the head, an optimum inward pull is exerted on the head as the band is drawn tight. Thus the head is securely held in place by the band and, in turn, the head holds and locks the band.

Likewise, the locking of the free end of the band by the tongues 14 serves to effectively close the opening in the head resulting from formation of the tongues, so that when applied to a hose under pressure, no openings remain in the clamp through which the material of the hose may be forced.

What I claim and desire to secure by Letters Patent is:

1. A hose clamp comprising a bendable strap, a slotted head on the strap, an arch on the head adjoining the slot providing an entrance for the free end of the strap and acting as an abutment over which the free end of the strap is folded, and arch-reinforcing means on the head for locking the folded portion of the strap thereto.

2. A hose clamp comprising a bendable strap, a slotted head on the strap, an arch on the head adjoining the slot providing an entrance for the free end of the strap and acting as an abutment over which the free end of the strap is folded, there being a strap-receceiving groove across the head transversely of the slot, and arch-reinforcing means on the head for locking the folded portion of the strap thereto.

3. A hose clamp comprising a bendable strap, a slotted head on the strap, an arch on the head adjoining the slot providing an entrance for the free end of the strap and acting as an abutment over which the free end of the strap is folded, and a bendable projection on the head normally positioned at a side of the arch in abutting relation thereto and bent into locking engagement with the folded end of the strap.

4. A hose clamp comprising a bendable strap, a slotted, relatively rigid head on the strap, an arch on the head adjoining the slot providing an entrance for the free end of the strap and acting as an abutment over which the free end of the strap is folded, and means comprising projections on the head abutting against the arch to resist distortion thereof when the band is drawn and adapted for locking the folded portion of the strap on the head.

5. A hose clamp comprising a bendable strap, and a slotted head on the strap, an arch on the head adjoining the slot providing an entrance for the free end of the strap and acting as an abutment over which the free end of the strap is folded, said head having bendable portions normally positioned adjacent opposite sides thereof in reinforcing relation to the arch and bent into locking engagement with the folded end of the strap.

6. A hose clamp comprising a head slotted adjacent one of its ends, a bendable strap having a hook fitted in the slot of the head, an arch on the head at the side of the slot providing an entrance for the free end of the strap and providing an abutment over which the free end of the strap is folded, and means on the head abutting against the arch to reinforce the same and adapted for locking the folded portion of the strap on the head.

7. A hose clamp comprising a slotted head, a bendable strap of substantially the same width as the slot, provided with a hooked end fitted thereinto, and having a free end adapted to be wrapped around a hose and to be passed through said slot, an arch on the head adjacent the slot providing an entrance for the free end of the strap and providing an abutment over which said free end of the strap is folded, and means on the head positioned to support the arch and adapted for locking the folded portion of the strap.

8. In a device of the character described, a locking head formed from a single blank of metal, having a strap-receiving groove therein, and having spaced slots positioned transversely of said groove, an arch on the head between said slots positioned transversely of said groove providing a strap entrance at the end of the groove, and strap-locking means on the head positioned adjacent the arch for supporting the same.

MICHAEL J. McANENY, Jr.